US012110905B2

(12) United States Patent
Qin et al.

(10) Patent No.: US 12,110,905 B2
(45) Date of Patent: Oct. 8, 2024

(54) LIQUID PUMP

(71) Applicant: Johnson Electric International AG, Murten (CH)

(72) Inventors: Ruifeng Qin, Hong Kong (CN); Yi Jing, Shenzhen (CN); Bensong Huang, Shenzhen (CN); Zhenzi Fang, Shenzhen (CN); Guanyin Liang, Shenzhen (CN); Guoyuan Zou, Shenzhen (CN); Denie Zeng, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 158 days.

(21) Appl. No.: 17/698,675

(22) Filed: Mar. 18, 2022

(65) Prior Publication Data

US 2022/0205455 A1 Jun. 30, 2022

Related U.S. Application Data

(63) Continuation of application No. PCT/CN2020/115053, filed on Sep. 14, 2020.

(30) Foreign Application Priority Data

Sep. 18, 2019 (CN) ......................... 201910882626.2

(51) Int. Cl.
*F04D 29/42* (2006.01)
*F04D 1/00* (2006.01)
(Continued)

(52) U.S. Cl.
CPC ............. *F04D 29/426* (2013.01); *F04D 1/00* (2013.01); *F04D 13/06* (2013.01); *F04D 29/086* (2013.01); *F05D 2230/234* (2013.01)

(58) Field of Classification Search
CPC .......... F04D 29/426; F04D 1/00; F04D 13/06; F04D 29/026; F04D 13/0626; F04D 29/086; F05D 2230/234; F05D 2300/603
See application file for complete search history.

(56) References Cited

U.S. PATENT DOCUMENTS 8,282,367 B2 * 10/2012 Ihle ..................... F04D 29/5893 310/86
2007/0021549 A1 * 1/2007 Kojima .................... C08K 7/14 524/609

(Continued)

FOREIGN PATENT DOCUMENTS

CN 1243919 A 2/2000
CN 101031718 A 9/2007

(Continued)

OTHER PUBLICATIONS

English language translation of International Search Report from corresponding PCT Application No. PCT/CN2020/115053 dated Dec. 17, 2020.

(Continued)

*Primary Examiner* — Dominick L Plakkoottam
(74) *Attorney, Agent, or Firm* — Aird & McBurney LP

(57) ABSTRACT

A liquid pump includes a pump house with an electric motor housed therein, a pump cover connected to the pump house, an impeller housed in the pump cover and driven by the motor, and a sleeve disposed between the pump cover and the pump house. Two of the pump cover, the pump house, and the sleeve are respectively provided with an outer binding segment and an inner binding segment, the outer binding segment is made of polyphenylene sulfide mixed with glass fiber, and permeable to a laser light, the inner binding segment is capable of absorbing the laser light.

5 Claims, 5 Drawing Sheets

(51) Int. Cl.
*F04D 13/06* (2006.01)
*F04D 29/08* (2006.01)

(56) References Cited

U.S. PATENT DOCUMENTS

| | | | | |
|---|---|---|---|---|
| 2007/0286753 | A1* | 12/2007 | Ihle | H02K 1/145 310/43 |
| 2008/0031748 | A1* | 2/2008 | Ihle | F04D 29/026 29/888.024 |
| 2008/0053534 | A1 | 3/2008 | Diesing et al. | |
| 2014/0044571 | A1* | 2/2014 | Nakamura | F04D 29/669 417/352 |
| 2017/0302126 | A1* | 10/2017 | Ehrsam | H02K 5/128 |
| 2017/0302133 | A1* | 10/2017 | Ehrsam | H02K 1/185 |
| 2019/0105436 | A1* | 4/2019 | Uchida | A61M 60/148 |

FOREIGN PATENT DOCUMENTS

| | | | | |
|---|---|---|---|---|
| CN | 103671907 A | 3/2014 | | |
| CN | 109854540 A | 6/2019 | | |
| CN | 208982361 U | 6/2019 | | |
| CN | 209340148 U | 9/2019 | | |
| DE | 19746763 A1 | 5/1999 | | |
| DE | 102009047332 A1 | * | 6/2011 | F02M 37/048 |
| JP | 2018189042 A | * | 11/2018 | |
| JP | 2019140826 A | * | 8/2019 | |
| JP | 2020002893 A | * | 1/2020 | |

OTHER PUBLICATIONS

English translation of CN109854540 from Google Patents dated Mar. 17, 2022.
English translation of CN101031718 from Google Patents dated Mar. 17, 2022.
English translation of CN209340148 from Google Patents dated Mar. 17, 2022.
English translation of CN103671907 from Google Patents dated Mar. 17, 2022.
English translation of DE19746763 from Google Patents dated Mar. 17, 2022.
English translation of CN1243919 from Google Patents dated Mar. 17, 2022.
English translation of CN208982361 from Google Patents dated Mar. 17, 2022.

* cited by examiner

LIQUID PUMP

This non-provisional patent application is a continuation application of PCT Application No. PCT/CN2020/115053, filed with the Chinese Patent Office on Sep. 14, 2020, which claims priority to Chinese Patent Application No. 201910882626.2, filed on Sep. 18, 2019, all of which are incorporated herein by reference in their entirety.

FIELD OF THE INVENTION

The invention relates to an electric actuator, in particular to a liquid pump

BACKGROUND

Traditionally, the mechanical connection between a house and a cover of pump of a liquid pump is performed by means of screws or the like. However, for liquid pumps with high air tightness requirements, the mechanical connection method can no longer meet the requirements. For this reason, in recent years, laser welding technology was gradually used to connect a pump house, a pump cover and a sleeve therebetween to improve the air tightness of the connection between all this parts. The basic principle of plastic laser welding is that the laser beam passes through the transparent outer plastic part and is absorbed by the inner plastic part. The laser energy is absorbed to increase the temperature of the inner plastic part, thereby melting the outer plastic part and the inner plastic part, and then welding the two plastic parts together. However, present plastic to form parts of the existing liquid pump has a low laser transmittance, resulting in insufficient welding strength between the parts.

SUMMARY

The present invention aims to provide a liquid pump that can solve or at least alleviate the above-mentioned problems.

A liquid pump includes a pump house with an electric motor housed therein, a pump cover connected to the pump house, an impeller housed in the pump cover and driven by the motor, and a sleeve disposed between the pump cover and the pump house. Two of the pump cover, the pump house, and the sleeve are respectively provided with an outer binding segment and an inner binding segment, the outer binding segment is made of polyphenylene sulfide mixed with glass fiber, and permeable to a laser light, the inner binding segment is capable of absorbing the laser light.

DETAILED DESCRIPTION

Embodiments of the present disclosure will be described in detail in conjunction with the drawings. It should be noted that the figures are illustrative rather than limiting. The figures are not drawn to scale, do not illustrate every aspect of the described embodiments, and do not limit the scope of the present disclosure.

Figure 1:
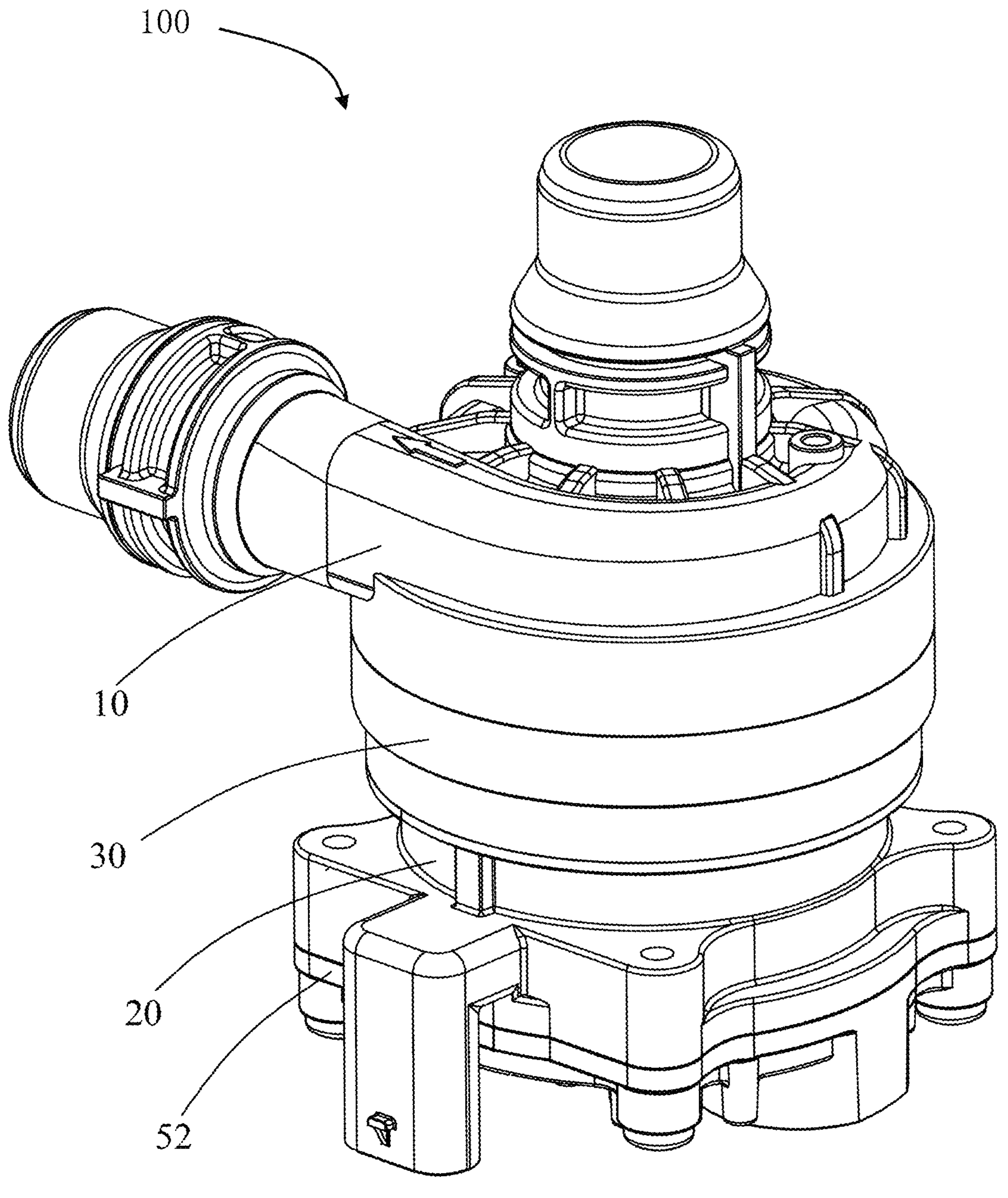
FIG. 1 is a perspective view of a liquid pump according to a first embodiment of the present invention.
Figure 2:
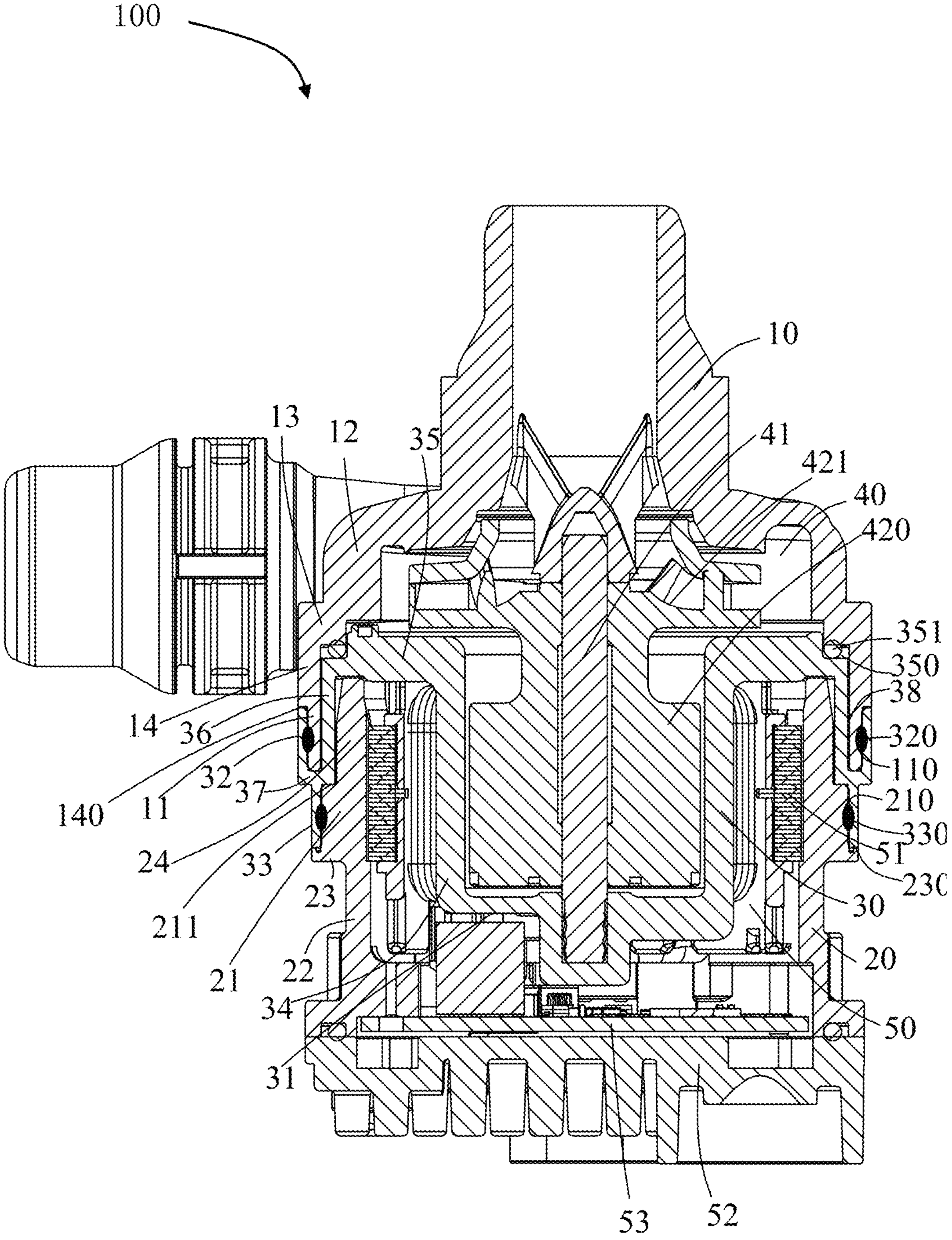
FIG. 2 is a cross-sectional view of the liquid pump shown in FIG. 1.
Figure 3:
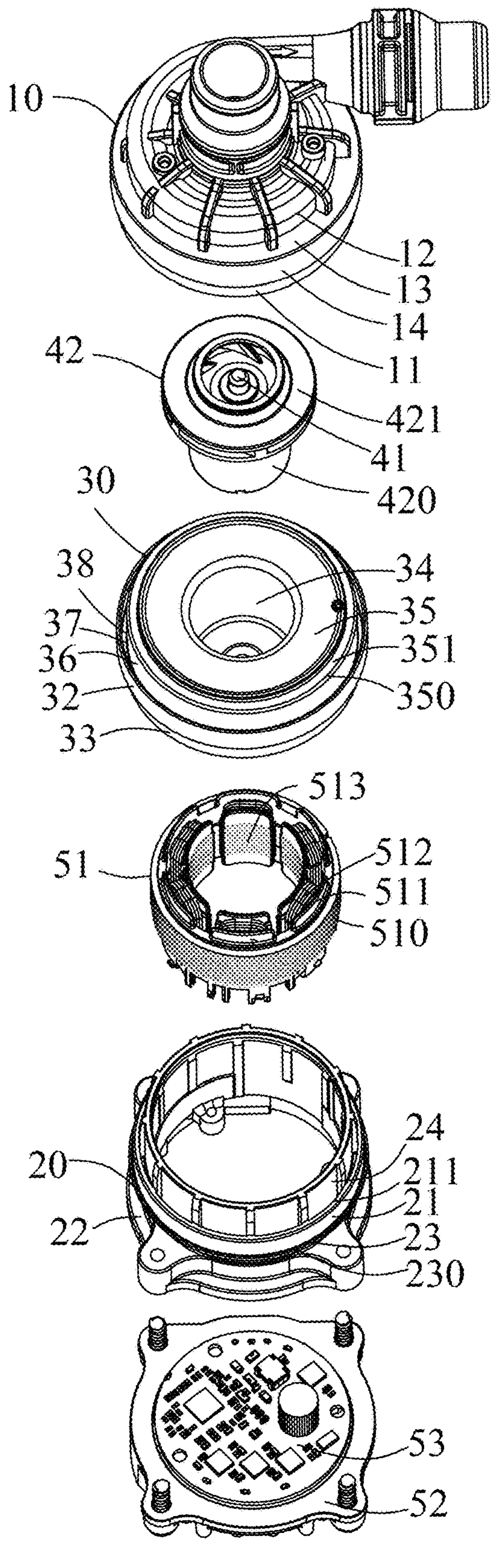
FIG. 3 is an exploded view of the liquid pump shown in FIG. 1.

Referring to FIGS. 1 to 3, a liquid pump 100 (in particular to a water pump) according to a first embodiment of the present invention includes a pump cover 10, a pump house 20, and a sleeve 30 arranged between the pump cover 10 and the pump house 20. A first cavity 40 is bounded by the pump cover 10 and the sleeve 30. The first cavity 40 is a wet cavity allowing liquid, such as water, enters therein. A second cavity 50 is bounded by the pump house 20 and the sleeve 30. The second cavity 50 is a drying cavity. The first cavity 40 and the second cavity 50 are sealed from each other. In this embodiment, the water pump further includes a fixed central shaft 41 and a rotor 42 accommodated in the first cavity 40, a stator 51 accommodated in the second cavity 50, an end cap 52 disposed at an end of the pump house 20 away from the pump cover 10 so as to close the second cavity 50, and a circuit board 53 mounted on a side of the end cap 52 facing the second cavity 50. One end of the central shaft 41 is fixedly connected to the pump cover 10 in an anti-rotational manner, and the other end of the central shaft 41 is fixedly connected to the sleeve 30 in an anti-rotational manner, e.g. via a knurled structure. The rotor 42 is rotatably sleeved on the central shaft 41. The rotor 42 includes a rotor core 420 and an impeller 421 axially arranged and integrally connected with each other. The rotor core 420 can be driven to rotate in interaction with the stator 51. The impeller 421 rotates synchronously with the rotor core 420 for pumping liquid. The stator 51 is annular. The stator is sleeved on the sleeve 30 and in radial alignment with the rotor core 420. Specifically, the stator 51 includes a stator core 510, an insulating frame 511 mounted on the stator core 510, and a winding 512 wound on the insulating frame 511. When the winding 512 is energized, a magnetic field is generated to polarize the stator core 510. Then, teeth 513 of the stator core 510 will interact with the rotor core 420, thereby making the rotor 42 rotate.

In this embodiment, the sleeve 30 includes a sleeve body 31, and a first outer binding segment 32 and a second outer binding segment 33 connected to and arranged at outside of the sleeve body 31. The first outer binding segment 32 and the second outer binding segment 33 connected to each other and extends axially. The first and second outer binding segment s 32, 33 are made of plastic-based materials, such as polyphenylene sulfide (PPS) mixed with glass fiber (GF) and is permeable to a laser light with a specific or a specific range of wavelength. The pump cover 10 has a first inner binding segment 11 abutting against a radial inner side of the first outer binding segment 32. The pump house 20 has a second inner binding segment 21 abutting against the radially inner side of the second outer binding segment 33. The first and second inner binding segments 11, 21 are also made of plastic-based materials, such as PPS mixed with GF, and have a dark color, such as black, thereby being cable capable of absorbing the laser light with said wavelength. The absorbed laser light will heat the plastic material to be melted and thereby sealingly connect the first/second outer binding segments 32/33 and the first/second inner binding segments 11/21. In this embodiment, Due to GF mixed in PPS, the permeability to the laser light of the first/second bind walls are improved. (A transmittance for the laser light with a wavelength of 915 nm is 10%-20%). As a result, the welding strength is improved. Preferably, the thickness of the first/second outer binding segment 32/33 is 1.0-1.2 mm, which is more helpful for the laser light to pass therethrough.

Specifically, in welding operation, a first outer sealing area 320 is formed on the radially inner side of the first outer binding segment 32, and a first inner sealing area 110, which is radially opposite to the first outer sealing area 320 is formed on radially outer side of the first inner binding segment 11. That is, the first outer binding segment 32 and the first inner binding segment 11 are welded together through the first outer sealing area 320 and the first inner sealing area 110. Similarly, a second outer sealing area 330 is formed on a radially inner side of the second outer binding segment 33, and a second inner sealing area 210, which is radially opposite to the second outer sealing area 330 is formed on a radially outer side of the second inner binding segment 21. That is, the second outer binding segment 33 and the second inner binding segment 21 are welded together through the second outer sealing area 330 and the second inner sealing area 210. Preferably, axial length of the first/second outer sealing area 320/330 and the first/second inner sealing area 110/210 is 5-7 mm, which can improve the reliability of the welding.

Specifically, the radially inner side of the laser welded first outer binding segment 32 forms a first outer sealing area 320, and the radially outer side of the first inner binding segment 11 forms a first inner side diametrically opposite to the first outer sealing area 320. The sealing area 110, i.e. the first outer binding segment 32 and the first inner binding segment 11 are welded together by the first outer sealing area 320 and the first inner sealing area 110. The radial inner side of the laser welded second outer binding segment 33 forms a second outer sealing area 330, and the radial outer side of the second inner binding segment 21 forms a second inner sealing area 210 diametrically opposite to the second outer sealing area 330. That is, the second outer binding segment 33 and the second inner binding segment 21 are welded together by the second outer sealing area 330 and the second inner sealing area 210. Preferably, the axial length of the first/second outer sealing area 320/330 and the first/second inner sealing area 110/210 is 5-7 mm, which is more conducive to improving the connection between the sleeve 30 and the pump cover 10/210. Welding strength of the pump house 20.

In this embodiment, the sleeve body 31 includes a cylindrical portion 34 with one of opposite axial ends opened and the other one closed. A ring-shaped flange 35 extending radially outward from the open end of the cylindrical portion 34, and an annular extension segment 36 extends from an outer periphery of the ring flange 35 in the axial direction toward the closed end of the cylindrical portion 34. Preferably, an annular groove 350 is defined in a side of the flange 35 facing the pump cover 10. The sleeve 30 also includes a rim 37 extending radially outward from an end of the extension segment 36. The rim 37 is connected between the first outer binding segment 32 and the second outer binding segment s 33. The first outer binding segment 32 axially extends upwards from the rim 37. The first outer binding segment 32, the rim 37 and the extension segment 36 cooperatively bound an insertion space 38 with substantially U-shaped cross-section for engagement of the first inner binding segment 11 of the pump cover 10. The second outer binding segment 33 extends downwards form the ring rim 37.

In this embodiment, the pump cover 10 includes a main body 12, a ring-shaped positioning segment 13 protruding radially outward from a bottom end of the main body 12, a ring-shaped extension portion 14 further extending axially downwards from an outer periphery of the positioning segment 13, and the first inner binding segment 11 extending further axially from a bottom end of the extension portion 14. A radial inner side of the positioning segment 13 abuts against a sidewall of the annular groove 350 of the sleeve 30. Preferably, a sealing member 351 is disposed between an axial end surface of the positioning segment 13 and a bottom wall of the annular groove 350 to improve the sealing performance between the pump cover 10 and the sleeve 30. Corresponding to the first outer binding segment 32, the first inner binding segment 11 is also preferably in ring-shaped. A radial thickness of the first inner binding segment 11 is also preferably approximately equal to a radial width of the insertion space 38, to enable the first inner binding segment 11 to be attached closely to the first outer binding segment 32, thereby facilitating welding operation. Preferably, A thickness of the first inner binding segment 11 is smaller than that of the extension portion 14, with an annular first step 140 formed at a joint between the extension portion 14 and the first inner binding segment 11. The radially outer side of the extension segment 36 of the sleeve 30 abuts against the radially inner side of the extension portion 14 and the first inner segment 11. The first step 140 abuts against a top end of the first outer binding segment 32 of the sleeve 30. A radial width of the first step 140 is preferably equal to the thickness of the first outer binding segment 32.

In this embodiment, the pump house 20 is substantially cylindrical and includes a base segment 22, a positioning ring 23, the second inner binding segment 21 and an upper segment 24, which are all ring-shaped and sequentially formed from bottom to top. The radial outer side of the second inner binding segment 21 of the pump house 20 is configured to abut against the second outer binding segment 33 of the sleeve 30. The radially outer side of the upper segment 24 of the pump house 20 abuts against the radially inner side of the extension segment 36 of the sleeve 30. Preferably, a radial width of the positioning ring 23 is greater than that of the second inner binding segment 21, and radial inner sides of the positioning ring 23 and the second inner binding segment 21 are flush with each other. Therefore, an annular second step 230 is formed at a joint between the positioning ring 23 and the second inner binding segment 21. The second step 230 supports the second outer binding segment 33 of the sleeve 30. A radial width of the second step 230 is preferably equal to the thickness of the second outer binding segment 33. Preferably, a radial width of the second inner binding segment 21 is greater than that of the upper segment 24, and radial inner sides of the second inner binding segment 21 and the upper segment 24 are flush with each other. Therefore, an annular third step 211 is formed at a joint between the second inner binding segment 21 and the upper segment 24.

In this embodiment, in an overall appearance of the pump 100, only the first first/second outer binding segment s 32/33 of the sleeve 30 are light-colored areas. The pump housing 10 and the pump house 20 are dark area. Since the light-colored area is located in an axial middle of the pump 100, and always shield by a mounting bracket in assembly. the overall appearance of the pump 100 in assembly is consistent.

Figure 4:
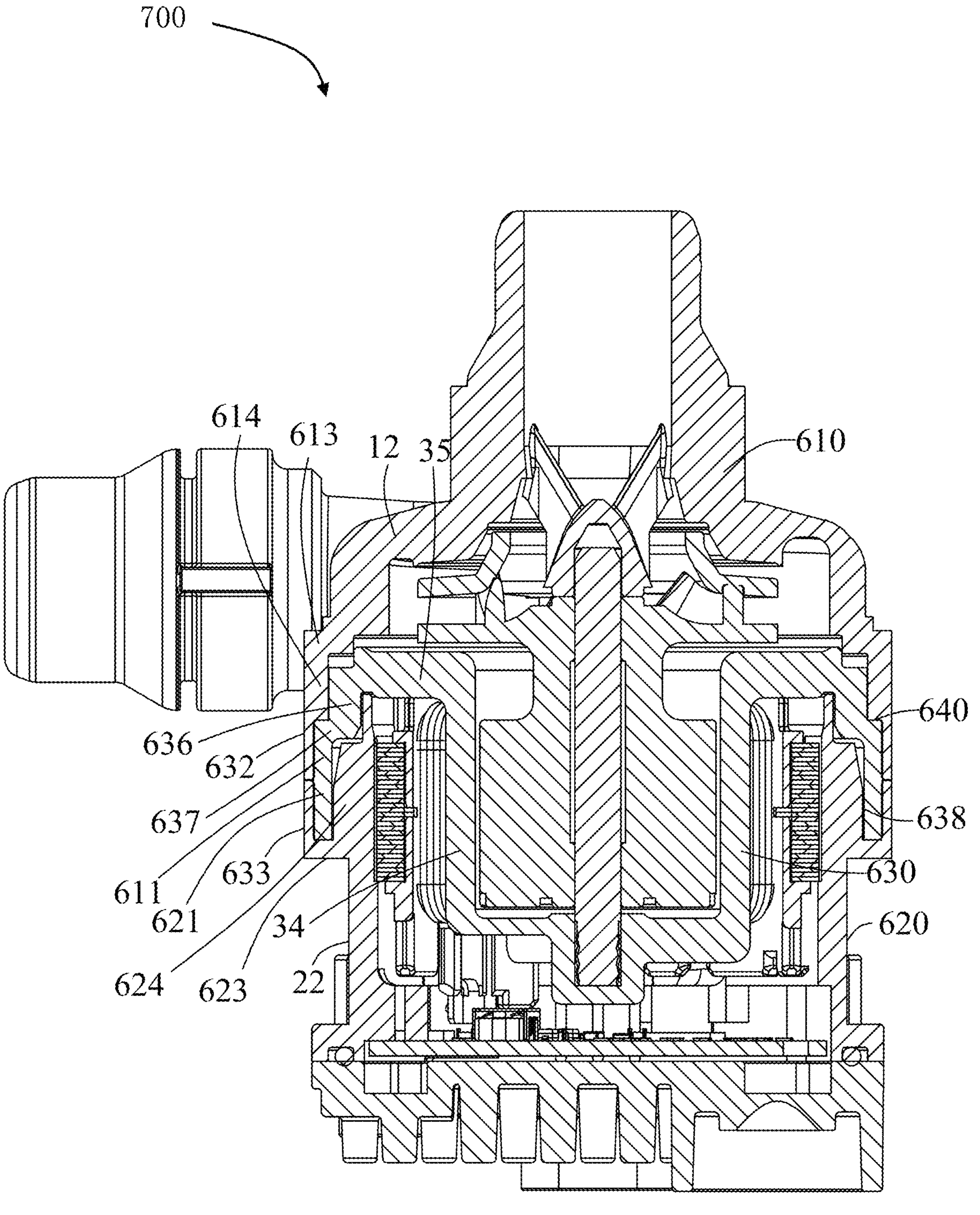
FIG. 4 is a cross-sectional view of a liquid pump according to a second embodiment of the present invention.
Figure 5:
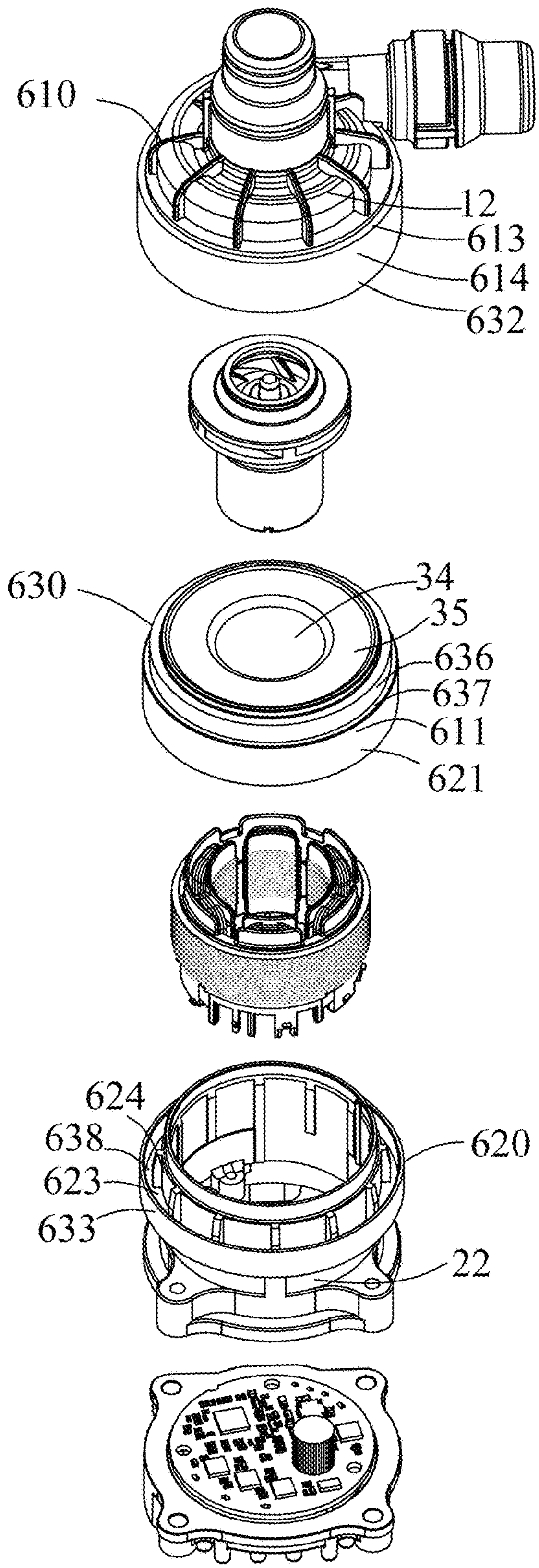
FIG. 5 is an exploded perspective view of the liquid pump shown in FIG. 4.

Referring to FIGS. 4 and 5, major differences between the pump 700 according to a second embodiment of the present invention and the pump 100 of the first embodiment is that a pump cover 610 forms a first outer binding segment 632, a pump house 620 forms a second outer binding segment 633, and a sleeve 630 forms a first inner binding segment 611 and a second inner binding segment.

Specifically, the sleeve 630 in the second embodiment includes a cylindrical portion 34 with one of opposite axial ends opened and the other one closed, a ring-shaped flange 35 extending radially outward from the open end of the cylindrical portion 34, and an annular extension segment 636 extending from an outer periphery of the ring flange 35 in the axial direction toward the closed end of the cylindrical portion 34, a rim 637 extending radially outward from an end of the extension segment 636. The first inner binding segment 611 and the second inner binding segment 621 extends from a periphery downwards and are arranged in turn in the axial direction. The sleeve 630 in the second embodiment has a simpler structure without excessive bending structures as compared to the first embodiment.

The pump cover 610 in the second embodiment includes a main body 12, a first flange 613 protruding radially outward from a bottom end of the main body 12, a ring-shaped extension portion 614 further extending axially downwards from an outer periphery of the positioning segment 613, and the first outer binding segment 632 extending further axially from a bottom end of the extension portion 614. A radially inner side of the extension portion 614 abuts against a radially outer side of the extension segment 636 of the sleeve 630. Preferably, a thickness of the first outer binding segment 632 is smaller than that of the extension portion 614, with an annular first step 640 formed at a joint between the first outer binding segment 632 and the extension portion 614. The first step 640 abuts a top end of the rim 637 of the sleeve 630. A radially inner side of the first outer binding segment 632 abuts a radially outer side of the first inner binding segment 611 of the sleeve 630.

In the second embodiment, the pump house 20 is substantially cylindrical and includes a base segment 22, a positioning ring 623, and an upper segment 624, which are all ring-shaped and sequentially formed from bottom to top. The positioning ring 623 has a greater diameter than that of the base segment 22 and the upper segment 24. The second outer binding segment 633 extending upwards from outer periphery of the positioning ring 623. The second outer binding segment 633, the positioning ring 623 and upper segment 624 cooperatively bound an insertion space 638 with substantially U-shaped cross-section for engagement of the second inner binding segment 621. A radial thickness of the second inner binding segment 621 is also preferably approximately equal to a radial width of the insertion space 638, to enable the second inner binding segment 621 to be attached closely to the second outer binding segment 633, thereby facilitating welding operation. A radial thickness of the second outer binding segment 633 of the pump house 620 is preferably equal to that of the first outer binding segment 632 of the pump cover 610. More preferably, a bottom end of the second outer binding segment 633 of the pump house 620 abuts against a top end of the first outer binding segment 632 of the pump housing 610.

It will be appreciated that in other embodiments, inner binding segments and outer binding segments can be arranged and configured in other alternative ways. For example, the outer binding segment may be formed on the pump house and the inner binding segment may be formed on the pump housing. Therefore, the pump house and the pump housing may be joined with each other by laser welding between the outer binding segment and the inner binding segment. To be noted that, in this circumstance, the sleeve will not be provided with any inner binding segment or outer binding segment for laser welding as described in the aforementioned embodiments. As a result, the structure of the sleeve can be much simpler without forming additional bent portions.

Similarly, in other embodiments, the outer binding segment may be formed on the pump cover, the inner binding segment may be formed on the pump house, and the outer binding segment and the inner binding segment may be connected to the pump house by laser welding between the outer binding segment and the inner binding segment.

The embodiments described above are provided by way of examples only, and various other modifications will be apparent to persons skilled in the field without departing from the scope of the invention as defined herein.

The invention claimed is:

1. A liquid pump, comprises:

a pump house with an electric motor housed therein;

a pump cover connected to the pump house, an impeller housed in the pump cover and driven by the motor;

a sleeve disposed between the pump cover and the pump house;

wherein two or more of the pump cover, the pump house, and the sleeve are respectively provided with at least one outer binding segment and at least one inner binding segment, said at least one outer binding segment is made of polyphenylene sulfide mixed with glass fiber, and permeable to a laser light, said at least one inner binding segment is capable of absorbing the laser light;

wherein the liquid pump further comprises a sealing member disposed at a joint between the pump cover and the sleeve;

wherein said at least one outer binding segment includes a first outer binding segment provided on the pump cover and a second outer binding segment provided on the pump house, said at least one inner binding segment is provided on the sleeve, and includes a first inner binding segment abutting against the first outer binding segment, and a second inner binding segment abutting against the second outer binding segment.

2. The liquid pump according to claim 1, characterized in that a transmittance of said at least one outer binding segment for the laser light with a wavelength of 915 nm is 10%-20%.

3. The liquid pump according to claim 2, wherein a thickness of said at least one outer binding segment is 1.0-1.2 mm.

4. The liquid pump according to claim 2 wherein said at least one outer binding segment is provided with an outer sealing area, said at least one inner binding segment is provided with an inner sealing area corresponding to the outer sealing area, axial length of the outer sealing area and the inner sealing area is 5-7 mm.

5. The liquid pump according to claim 1, wherein the sleeve also comprises a rim extending radially outwards, the first inner binding segment and the second inner binding segment extends from a periphery of the rim downwards and are arranged in turn in the axial direction.

* * * * *